United States Patent [19]

Park

[11] Patent Number: 5,351,745
[45] Date of Patent: Oct. 4, 1994

[54] REFRIGERATOR SYSTEM HAVING A FUNCTION CAPABLE OF FERMENTING FOOD

[75] Inventor: Seak H. Park, Suwon, Rep. of Korea

[73] Assignee: Samsung Electronics Co., Ltd., Suwon, Rep. of Korea

[21] Appl. No.: 83,486

[22] Filed: Jun. 30, 1993

[30] Foreign Application Priority Data

Jul. 8, 1992 [KR] Rep. of Korea ............... 92-12150
Apr. 15, 1993 [KR] Rep. of Korea ............... 93-6343

[51] Int. Cl.$^5$ .................. F25B 29/00; G12H 1/00; A23B 4/00
[52] U.S. Cl. .................. 165/30; 62/198; 62/197; 62/117; 165/918; 99/468.470; 99/483; 99/486
[58] Field of Search .......... 165/30, 918; 62/117, 62/198, 197; 99/468, 470, 483, 486

[56] References Cited

U.S. PATENT DOCUMENTS

| | | | |
|---|---|---|---|
| 2,471,137 | 5/1949 | Atchison | 62/198 |
| 4,227,379 | 10/1980 | Oonishi | 62/198 |
| 4,389,854 | 6/1983 | Ogita et al. | 62/198 |
| 4,499,738 | 2/1985 | Motoyama et al. | 62/198 |
| 4,726,160 | 2/1988 | Kawaguchi et al. | 62/198 |
| 4,741,178 | 5/1988 | Fujiu et al. | 62/198 |
| 5,142,969 | 9/1992 | Chun | 99/468 |
| 5,228,499 | 7/1993 | Yoon | 165/30 |

FOREIGN PATENT DOCUMENTS

| | | | |
|---|---|---|---|
| 0028845 | 3/1978 | Japan | 62/198 |
| 0124367 | 10/1978 | Japan | 62/198 |
| 1406883 | 9/1975 | United Kingdom | 62/198 |

Primary Examiner—John K. Ford
Attorney, Agent, or Firm—Burns, Doane, Swecker & Mathis

[57] ABSTRACT

A refrigerating system includes a first compartment used solely for cold storage, and a second compartment used either for cold storage or fermentation. First and second heat exchangers are disposed for cooling the first and second compartments, respectively. An outlet of the second heat exchanger communicates with an inlet of the first heat exchanger. A refrigerant distribution mechanism is operable in either a fermentation mode or a cold storage mode. In the fermentation mode, refrigerant is directed through first and second flow passages to the first and second heat exchangers, respectively, such that more refrigerant is delivered to the first heat exchanger than to the second heat exchanger; also, a heater in the second compartment is activated. In the cold storage mode, refrigerant is directed to the second flow passage but not to the first flow passage. An outlet of the second heat exchanger communicates with an inlet of the first heat exchanger, whereby in both the fermentation mode and the cold storage mode, refrigerant which flows through the second heat exchanger then flows through the first heat exchanger.

6 Claims, 6 Drawing Sheets

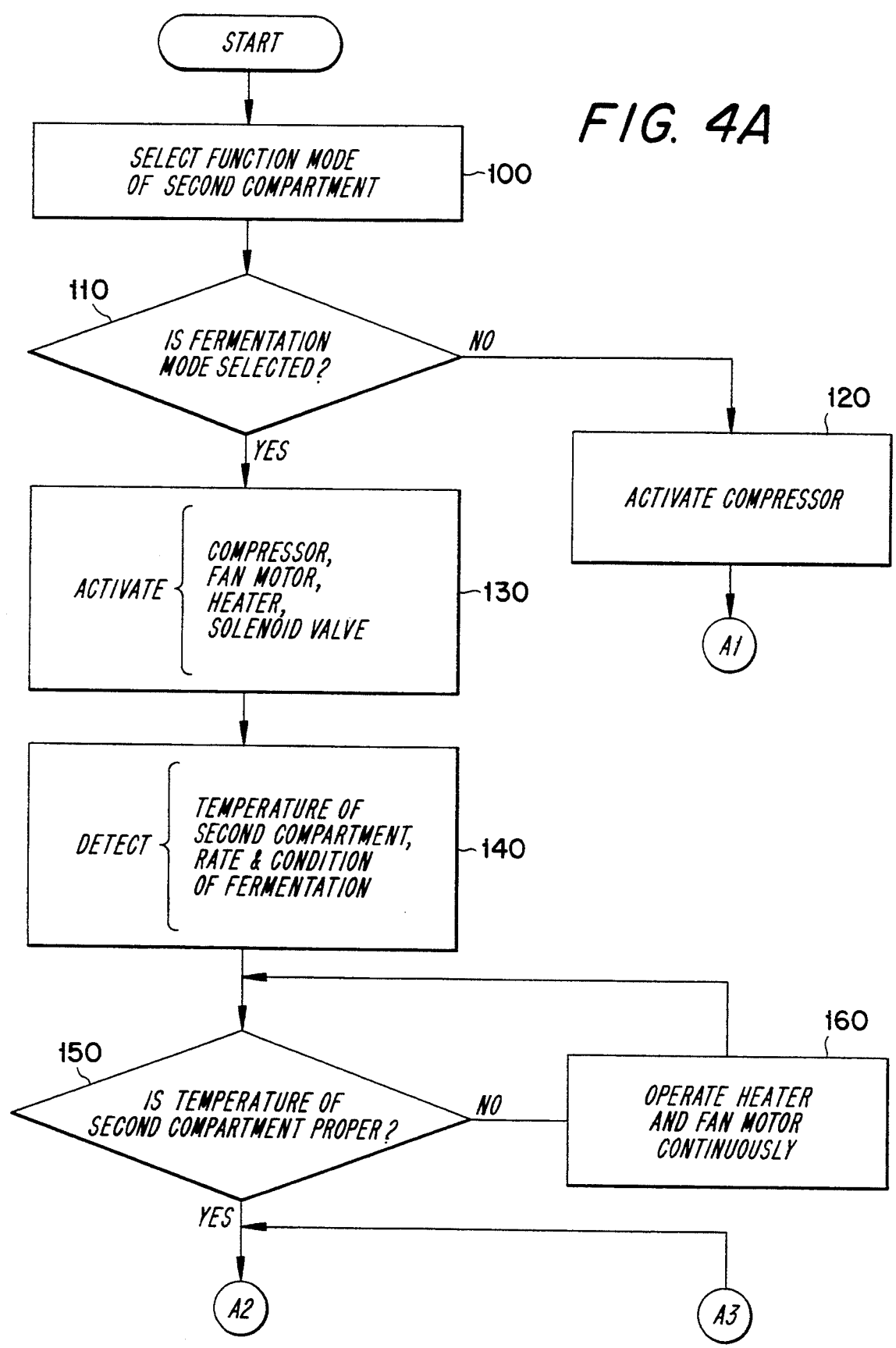

REFRIGERATOR SYSTEM HAVING A FUNCTION CAPABLE OF FERMENTING FOOD

BACKGROUND OF THE INVENTION

1. Field of the Invention

The present invention is related to a refrigerating system having a function capable of fermenting food in addition to the conventional functions thereof, and particularly to a refrigerating system for optimally fermenting food, for example Kimchi, which consists of pickled vegetables.

2. Description of the Prior Art

Ordinarily, a refrigerator has a freezing compartment available for quick freezing or storing food at a relatively lower temperature and a refrigerating compartment available for storing food at the relatively higher temperature for a long time.

A refrigerant tube forming a closed cycle is mounted on the rear of the interior wall of the freezing and refrigerating compartments and a compressor, a condenser, an evaporator and a capillary tube are integrated in the closed cycle to perform the refrigerating cycle.

The operation of the refrigerating system is usually controlled by a system controller, for example, a microprocessor.

A movable damper is located in the partition wall which separates the interior space of the refrigerator into the freezing and refrigerating compartments, in order to properly distribute cool air produced by the refrigerating system to the freezing and refrigerating compartments.

In the conventional refrigerating system described above, the compressor converts the refrigerant which has a low temperature and low pressure into a gas with a high temperature and a high pressure, and then the refrigerant is moved to the condenser. The refrigerant is condensed by the condenser into a liquid state with a low temperature and a high pressure, and then is forwarded to the evaporator via the capillary tube. The refrigerant passed through the capillary tube with a small diameter is in a liquid state with a low temperature and a low pressure. The refrigerant is then evaporated through the evaporator, thereby absorbing the heat of the freezing and refrigerating compartments. Accordingly, the temperature in the freezing and refrigerating compartments is reduced.

A microprocessor evaluates temperature information for the freezing and refrigerating compartments, and then controls the opening and closing operations of the damper so that the freezing and refrigerating compartments are maintained at the respectively desired temperature.

However, the conventional refrigerating system can only store food at given pre-set temperatures.

Therefore, there is a problem in that the nutritive substance included in the food may be destroyed due to the relatively low temperature.

Furthermore, there is another problem in that the fermentation substances which require specific temperature ranges can not function well outside the specific temperature range.

SUMMARY OF THE INVENTION

It is an object of the present invention to provide a refrigerating system having a function capable of fermenting food in addition to the conventional functions thereof.

It is another object of the present invention to provide a refrigerating system including capillary tubes having flow resistances different from each other and a heater exclusively used for fermentation, thereby optimally fermenting food such as Kimchi.

In order to achieve these objects, the refrigerating system according to the present invention includes a first compartment always used as a storage compartment; a second compartment used as either a fermentation or a storage compartment; a compressor for converting the refrigerant into a gas state with a high temperature and a high pressure; a condenser for converting the refrigerant from the compressor into a liquid state with a low temperature and a high pressure; heating means mounted at a proper position in the second compartment used to raise the temperature therein; a solenoid valve for deciding the flow passage of the refrigerant; a first and a second capillary tubes for converting the refrigerant from the condenser into a liquid state with a low temperature and a low pressure, the first and second capillary tubes branching off from the solenoid valve; a first flow passage connected via the solenoid valve and the first capillary tube to a first heat exchanger mounted on the first compartment; a second flow passage connected to the junction of the first heat exchanger and the first capillary tube via the solenoid valve, the second capillary tube and a second heat exchanger mounted on the second compartment; and, means for controlling the temperature of the second compartment; whereby, when food is to be fermented in the second compartment, the control means controls the operation of the solenoid valve so that the refrigerant flows through both the first and second flow passages in order to maintain the interior spaces of the first and second compartments at the respectively desired temperatures; when the fermentation operation is completed in the second compartment, the control means controls the solenoid valve so that the refrigerant flows only through the second flow passage in order to maintain the interior spaces of the first and second compartments at the desired temperature.

The control means of the refrigerating system may be embodied by a microprocessor. The refrigerating system may further include a pre-capillary tube between the solenoid valve and the condenser and a fan motor in order to evenly diffuse throughout the second compartment the heat produced by the heating means.

The compressor, heater, fan motor and solenoid valve may be operated by respective drive means. The interior temperature sensing means, fermentation condition and fermentation rate sensing means are connected to the microprocessor via a respective signal converting means.

BRIEF DESCRIPTION OF THE DRAWINGS

These and other aspects of the present invention are clarified in the accompanying drawings in which.

DETAILED DESCRIPTION OF THE PREFERRED EMBODIMENT

Hereinafter, a refrigerating system according to the present invention will be described in detail in reference to the accompanying drawings.

Figure 1A:
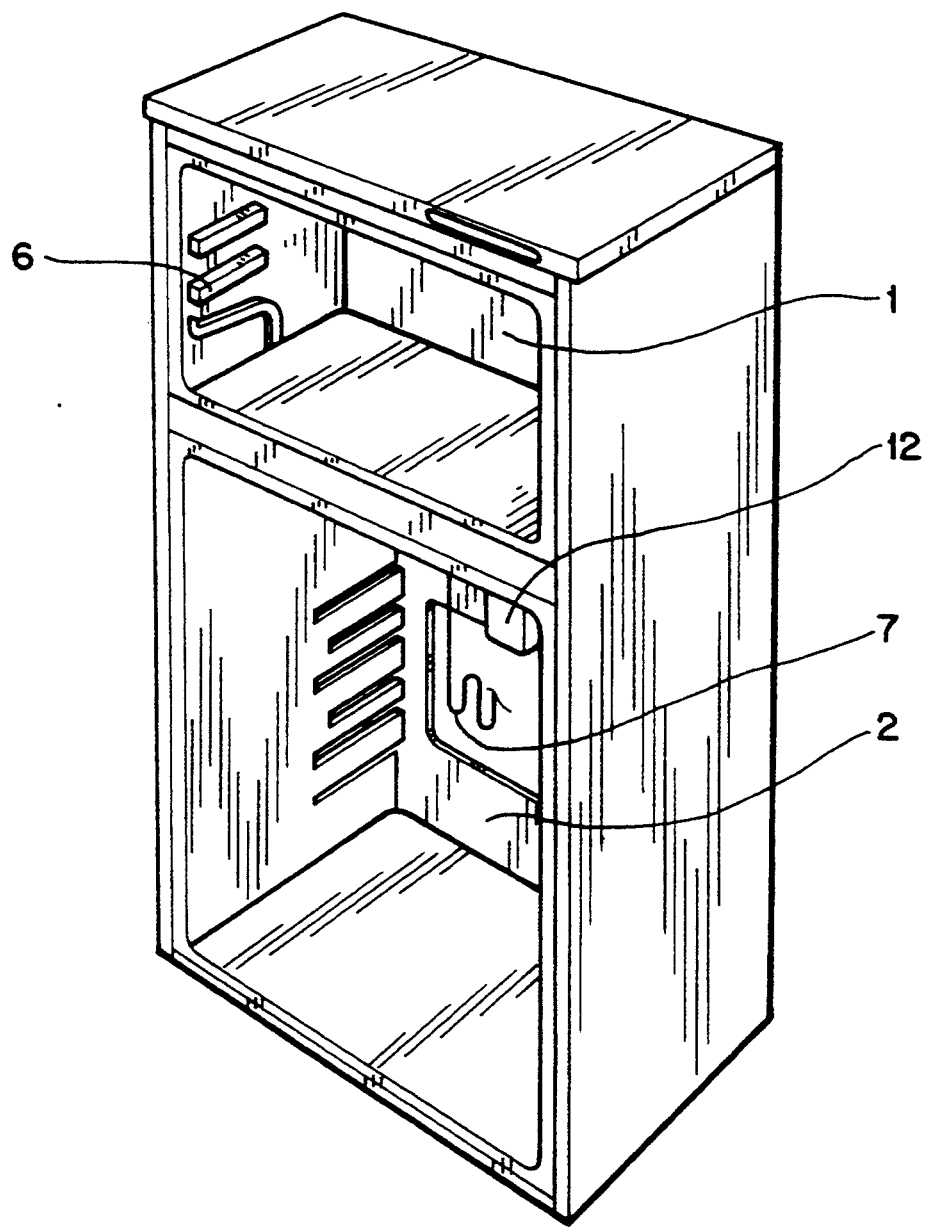
FIG. 1A is a perspective view of a refrigerator according to the present invention in a state wherein the door thereof has been removed.
Figure 1B:
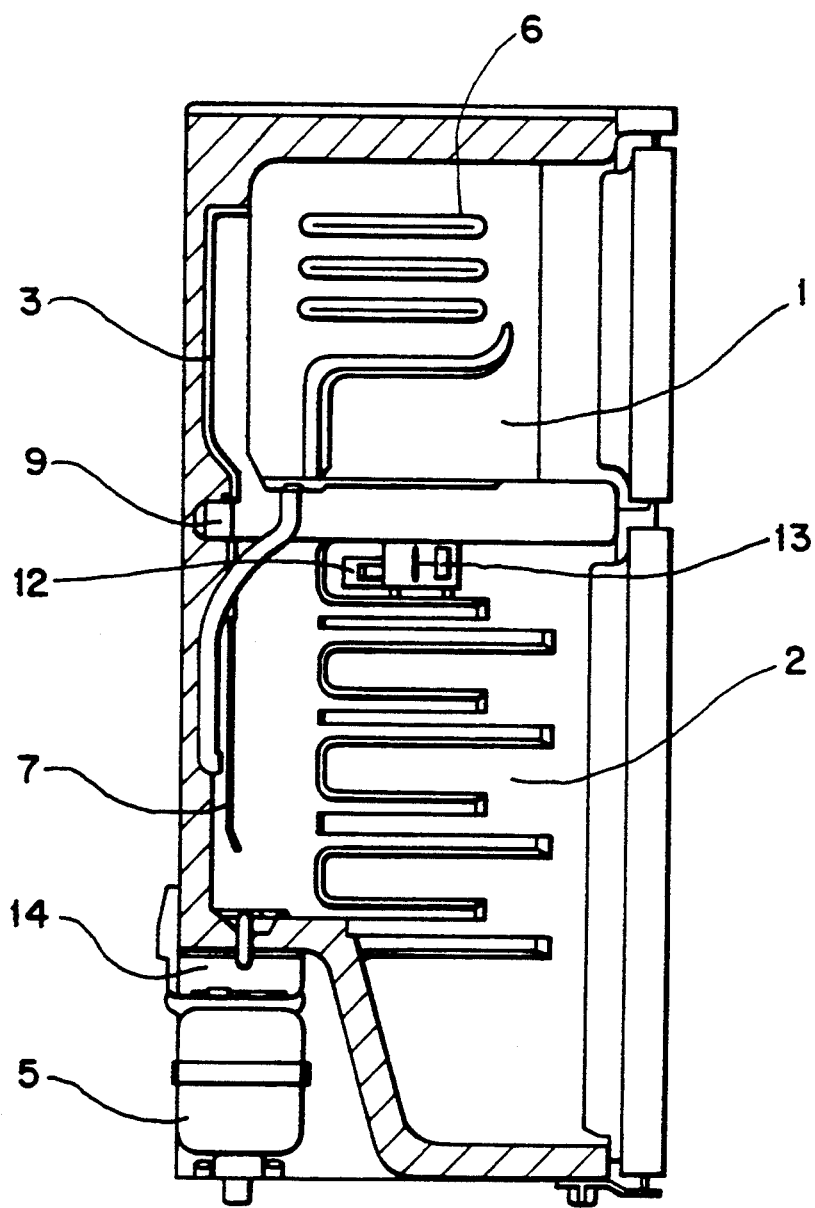
FIG. 1B is a vertical cross sectional view of a refrigerator according to the present invention.
Figure 3:
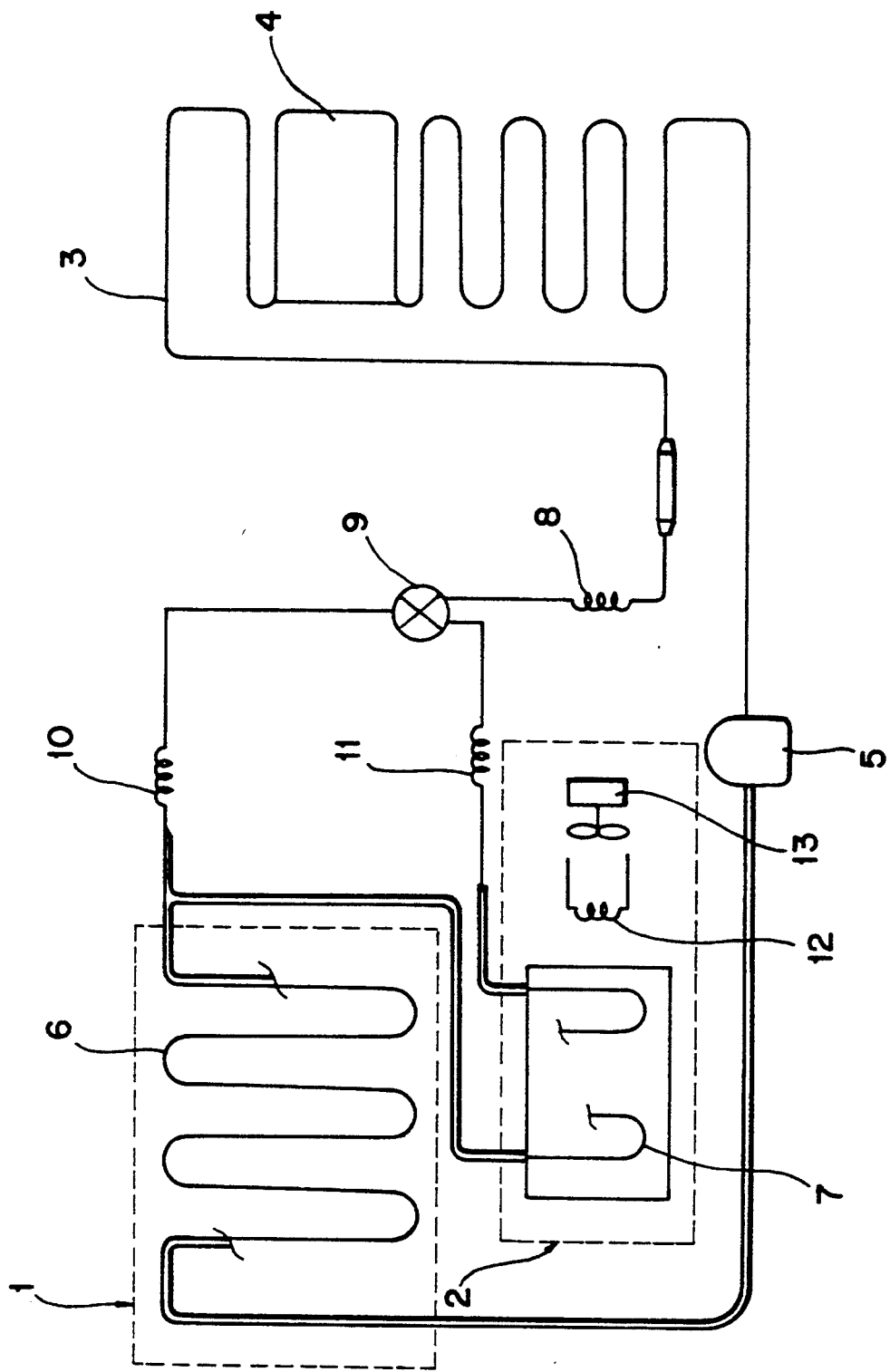
FIG. 3 is a view showing a refrigeration cycle according to the present invention; and, FIG. 4 is a flow-chart showing an algorithm for performing the functions of the microprocessor shown in FIG. 2.

Referring to FIGS. 1 and 3, the refrigerator of the present invention is comprised of a first compartment 1 for storing food and a second compartment 2 for either fermenting or storing food, for example, Kimchi which is made of radish, cabbage or cucumber, spiced with pepper, garlic, onion, ginger, and so on.

A refrigerant tube 3 formed in a closed cycle is mounted on the rear of the interior wall of both first and second compartments 1 and 2. A compressor 5, which converts the refrigerant into a gas state with a high temperature and a high pressure, is located at the proper position in refrigerant tube 3 which is mounted in the lower part of second compartment 2. A condenser 4, which converts the refrigerant from compressor 5 into a liquid state with a low temperature and a high pressure, is also located at a proper position of refrigerant tube 3. A pre-capillary tube 8, which preliminarily converts the refrigerant from condenser 4 into a liquid state with a low temperature and a low pressure, is connected to the outlet of condenser 4, and a solenoid valve 9, which selects the flow passage of the refrigerant, is connected to the outlet of pre-capillary tube 8. First and second heat exchangers 6 and 7, which lower the temperature of first and second compartments 1 and 2 respectively by absorbing the heat therein, are located at the proper positions of first and second compartments 1 and 2. First and second capillary tubes 10 and 11, which again lower the pressure of the refrigerant after it has been initially lowered by pre-capillary tube 8, respectively branch off from solenoid valve 9 and are connected to the inlets of first and second heat exchangers 6 and 7 respectively. The second capillary tube 11 is formed in such a way to have greater flow resistance than that of first capillary tube 10 so that more of the refrigerant may flow through first capillary tube 10.

The outlet of second heat exchanger 7 is connected to the inlet of first heat exchanger 6 by the refrigerant tube. The outlet of first heat exchanger 6 is connected to compressor 5 by the refrigerant tube.

Hereinafter, the refrigerant flow passage which conducts refrigerant from valve 9 to the first heat exchanger 6, is termed a first flow passage. The refrigerant flow passage, which conducts refrigerant from valve 9 to the first heat exchanger 6, is termed a second flow passage.

Heater 12, which raises the temperature of second compartment 2 to a value suitable for fermenting food, is located at the proper position in second compartment 2. A fan motor 13 for evenly diffusing the heat produced by heater 12 throughout second compartment 2 is mounted in the vicinity of heater 12.

A water containment member 14 for removing moisture created by the defrost is mounted on compressor 5.

Figure 2:
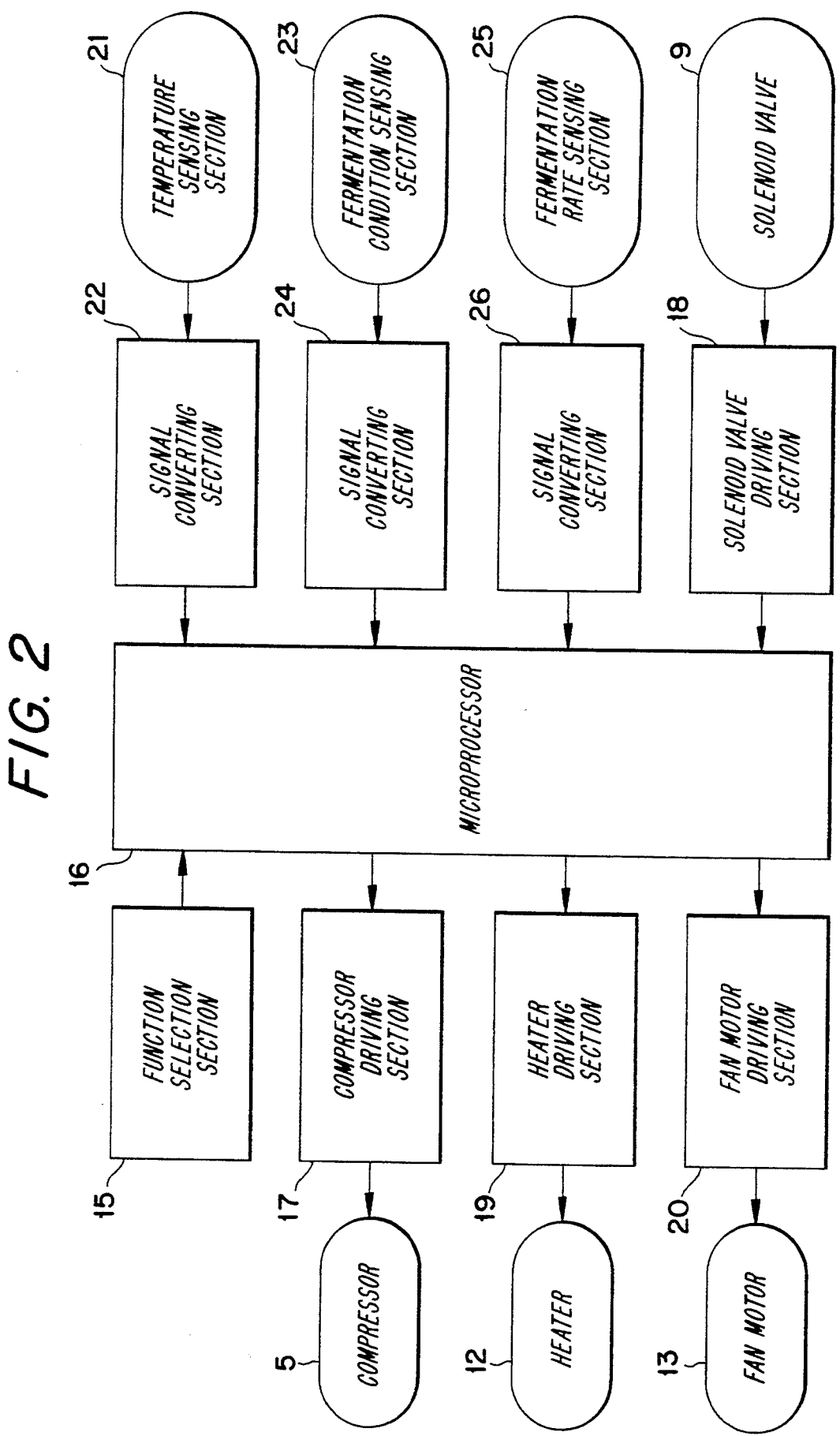
FIG. 2 is an electrical block diagram of a refrigerating system according to the present invention.

FIG. 2 is an electrical block diagram of the refrigerating system according to the present invention.

Referring to FIG. 2, the refrigerating system includes a function selecting section 15 for selecting either a fermentation or a general storage function, a microprocessor 16 for controlling the entire operations of the refrigerating system according to the selected function from the function selecting section 15, a compressor drive section 17 for operating compressor 5 in order to circulate the refrigerant, a solenoid valve drive section 18 for operating solenoid valve 9 in order to select the flow passage of the refrigerant, a heater drive section 19 for operating heater 12 in order to properly maintain a desired fermentation temperature in the interior space of second compartment 2 and a fan motor drive section 20 for operating fan motor 13 in order to evenly diffuse the heat from heater 12 throughout second compartment 2. These drive sections are operated under the control of microprocessor 16.

Several sensing sections for detecting several conditions in the second compartment 2 are connected to microprocessor 16 via a respective signal converting section. That is, a temperature sensing section 21 for detecting the interior temperature of second compartment 2, a fermentation condition sensing section 23 for detecting the fermentation condition of the food and a fermentation rate sensing section 25 for detecting the fermentation rate of food are all connected to microprocessor 16 via their respective signal converting section. The signal converting sections 22, 24 and 26 convert the analog signals produced from the sensing sections 21, 23 and 25 into corresponding digital signals and then output the digital signals to the microprocessor 16.

The fermentation condition and rate sensing sections 23 and 25 may be embodied by a Kimchi fermentation sensor which is disclosed in the U.S Pat. No. 5,142,969 owned by the same applicant as the present invention. The fermentation condition sensing section 23 may also be embodied by using a common acidity sensor.

Hereinafter, the operation of the refrigerating system will be described in detail.

Figure 4B:
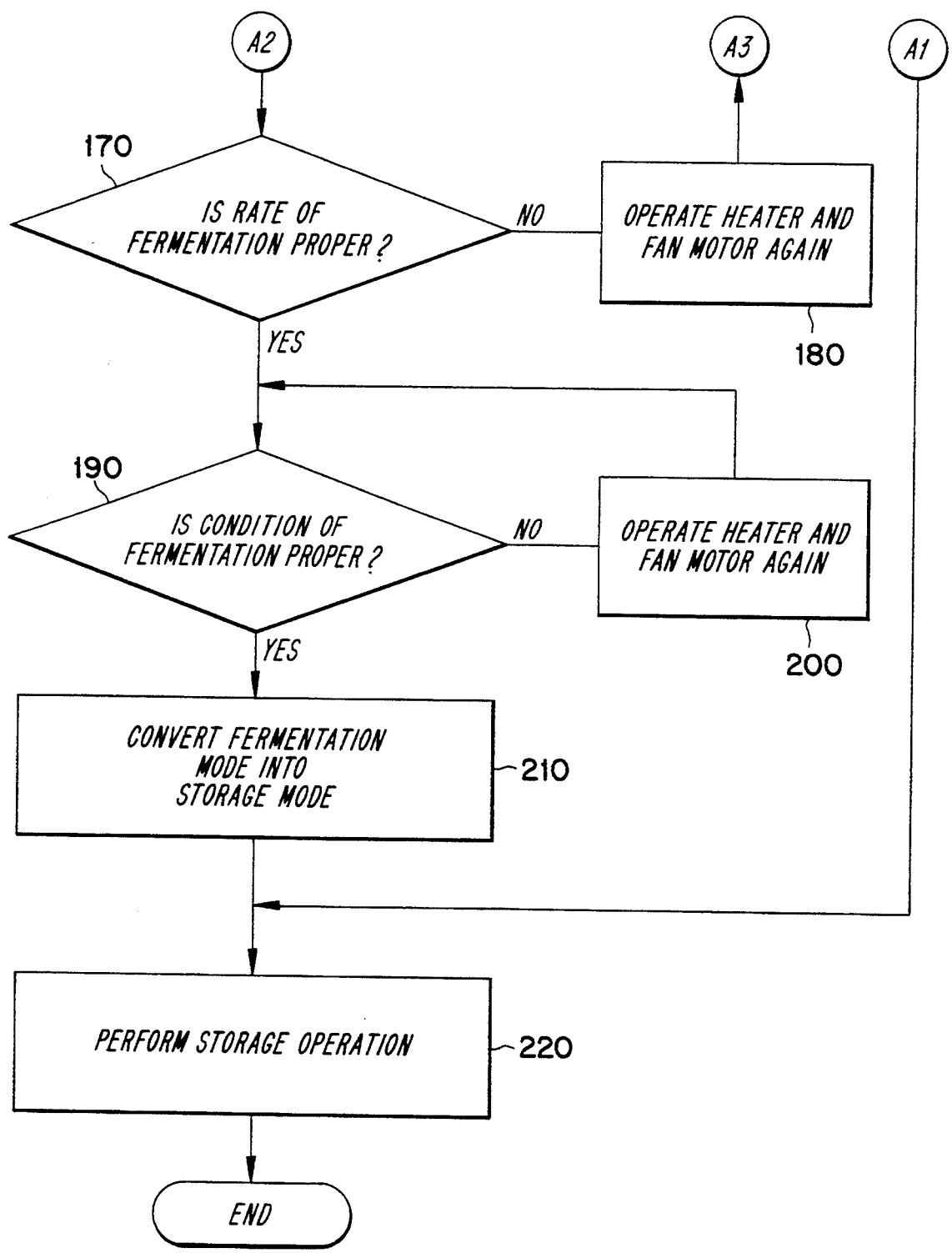

FIG. 4 is a flow-chart showing an algorithm for performing the functions of the microprocessor shown in FIG. 2.

Referring to FIG. 4, when the refrigerator becomes operational, if user selects a fermentation function, microprocessor 16 starts to operate the refrigerating system according to the loaded program in steps 100 and 110. Then, first compartment 1 is used as a storage compartment (first compartment 1 is used exclusively as a storage compartment) and second compartment 2 is used as a fermentation and storage compartment.

When the fermentation function is selected, microprocessor 16 outputs control signals to each of drive sections 17 to 20 in order to activate compressor 5, solenoid valve 9, heater 12 and fan motor 13 in step 130. Until the fermentation operation is completed, power is continuously supplied to the coil (not shown) of solenoid valve 9 such that the refrigerant passed through pre-capillary tube 8 flows through both of the first and second capillary tubes 10 and 11.

Because the flow resistance of first capillary tube 10 is smaller than that of second capillary tube 11, the amount of refrigerant flowing through first capillary tube 10 is greater than the amount of refrigerant flowing through second capillary tube 11. Therefore, the amount of refrigerant which is evaporated through first heat exchanger 6 located in first compartment 1 is also relatively greater, thereby maintaining a relatively low temperature, for example almost the freezing point in the interior space of first compartment 1. The interior temperature of first compartment 1 is controlled by the intermittent operation of compressor 5.

On the other hand, the amount of refrigerant which is evaporated through second heat exchanger 7 located in second compartment 2 is relatively less, thereby maintaining a temperature in the interior space of second compartment 2 which is higher than the interior temperature of first compartment 1.

By maintaining the interior temperature of second compartment 2 at a relatively higher temperature, it is possible to easily and rapidly raise the interior temperature of second compartment 2 to a temperature required for fermentation, for example between 20° C. to 30° C.

The interior temperature of second compartment 2, which is used as a fermentation compartment, is controlled by the intermittent operation of heater 12 regardless of the operation of compressor 5. While heater 5 is activated, fan motor 13 is also activated in order to minimize deviations in the temperature throughout second compartment 2.

The interior temperature of second compartment 2 is monitored by microprocessor 16 through temperature sensing section 21 and signal converting section 22. In step 150, the microprocessor 16 compares the interior temperature of second compartment 2 with a reference temperature previously stored therein, and when the inner temperature of second compartment 2 is lower than the reference temperature, microprocessor 16 operates heater 12 and fan motor 13 in step 160.

When the interior temperature of second compartment 2 is equal to the reference temperature in step 150, the process goes to step 170. In step 170, microprocessor 16 compares the current fermentation rate with a reference fermentation rate. The sensing operation of the fermentation rate is achieved by fermentation rate sensing section 25 and signal converting section 26.

When the current fermentation rate does not reach the reference fermentation rate in the comparison results in step 170, microprocessor 16 outputs control signals to heater drive section 19 and fan motor drive section 20, thereby activating heater 12 and fan motor 13 respectively.

By repeating the operation of steps 170 and 180, the current fermentation rate reaches the reference fermentation rate, the process goes to step 190. In step 190, microprocessor 16 compares the current fermentation condition with a reference fermentation condition.

The sensing operation of the fermentation condition is achieved by fermentation condition sensing section 23 and signal converting section 24. When the current fermentation condition does not reach the reference fermentation condition in the comparison results in step 190, heater 12 and fan motor 13 are activated to maintain the inner temperature of second compartment 2 and the fermentation rate at the respective reference values. By repeating the operation described above, the current fermentation condition reaches the reference fermentation condition, the fermentation operation is completed. Then, second compartment 2 is subsequently used as a storage compartment in step 210.

Hereinafter, the use of second compartment 2 as a storage compartment 2 will be described in detail.

When the fermentation operation is completed, microprocessor 16 outputs a control signal to solenoid valve drive section 18, thereby cutting off the power applied to the coil of solenoid valve 9. When the power applied to the coil of solenoid valve 9 is cut off, the refrigerant tube connected to first capillary tube 10 becomes closed and the refrigerant tube connected to second capillary tube 11 is opened. Accordingly, the refrigerant passed through pre-capillary tube 8 only passes through second capillary tube 11. That is, a series refrigeration cycle which sequentially passes through compressor 5, condenser 4, pre-capillary tube 8, solenoid valve 9, second capillary tube 11, second heat exchanger 7, first heat exchanger 6 and compressor 5 is formed. During the operation of this refrigeration cycle, the interior temperature of both first compartment 1 and second compartment 2 is the same, and thus second compartment 2 can be used as the storage compartment in step 220.

When second compartment 2 is used as a storage compartment, heater 12 and fan motor 13 are not activated. That is, the interior temperature of first and second compartments 1 and 2 is controlled only by the intermittent operation of compressor 5.

On the other hand, when a user selects the storage function in step 100, second compartment 2 is used as a storage compartment and not as a fermentation compartment. That is, the power is not initially applied to the coil of solenoid valve 9 and thus the refrigeration cycle described above is formed.

I claim:

1. A refrigerating system having a cold storage function and a fermenting function, comprising
   a first compartment constituting a cold storage compartment, said first compartment including a first heat exchanger for cooling said first compartment;
   a second compartment selectively constituting a cold storage compartment and a fermentation compartment, said second compartment including a second heat exchanger for cooling said second compartment and a heater for heating said second compartment;
   refrigerating means for cooling and circulating a refrigerant;
   a first flow passage for conducting the refrigerant to said first heat exchanger;
   a second flow passage for conducting the refrigerant to said second heat exchanger;
   refrigerant distributing means including valve means movable between:
     a first position for directing some refrigerant to said first flow passage, and some refrigerant to said second flow passage, and
     a second position for directing refrigerant to said second flow passage and blocking the flow of refrigerant to said first flow passage;
   a conduit for conducting refrigerant exiting said second heat exchanger to an inlet of said first heat exchanger;
   and control means connected to said valve means and said heater and selectively actuable for:
     positioning said valve means in said first position while at least periodically actuating said heater, to effect a fermentation operation in said second compartment, and
     positioning said valve means in said second position while keeping said heater deactivated, to effect cold storage operations in said first and second compartments.

2. A refrigerating system according to claim 1, wherein said refrigerant distributing means includes means for directing a greater flow of refrigerant to said first flow passage than to said second flow passage when said valve means is in said first position.

3. A refrigerating system according to claim 2 further including first and second capillary tubes disposed in said first and second flow passages, respectively, said second capillary tube having a greater flow resistance than said first capillary tube to define said means for directing a greater flow of refrigerant to said first flow passage than to said second flow passage.

4. A refrigerating system according to claim 3, wherein said refrigeration means comprises a compressor for emitting a refrigerant in a gas state with a high temperature and a high pressure; a condenser for converting refrigerant from said compressor into a liquid state with a low temperature and high pressure, and a pre-capillary tube for lowering the pressure of refrigerant discharged from said condenser, said valve means being disposed downstream of said pre-capillary tube.

5. A refrigerating system according to claim 4, wherein an outlet of said first heat exchanger communicates with an inlet of said compressor.

6. A refrigerating system according to claim 1, wherein said heater includes a fan for distributing heat within said second compartment.

* * * * *